(12) United States Patent
Kim

(10) Patent No.: US 7,264,280 B2
(45) Date of Patent: Sep. 4, 2007

(54) FLEXIBLE TUBE FOR AN EXHAUST PIPE OF AN AUTOMOBILE

(75) Inventor: Dae Hyun Kim, Ansan-si (KR)

(73) Assignee: SJM Co., Ltd., Kyunggi-do (KR)

( * ) Notice: Subject to any disclaimer, the term of this patent is extended or adjusted under 35 U.S.C. 154(b) by 83 days.

(21) Appl. No.: 11/213,532

(22) Filed: Aug. 26, 2005

(65) Prior Publication Data

US 2007/0035125 A1   Feb. 15, 2007

(30) Foreign Application Priority Data

Jun. 15, 2005   (KR) .................. 10-2005-0051544

(51) Int. Cl.
F16L 27/10 (2006.01)
(52) U.S. Cl. .................................... 285/226
(58) Field of Classification Search ............... 285/226, 285/227, 228, 145.5
See application file for complete search history.

(56) References Cited

U.S. PATENT DOCUMENTS

| | | |
|---|---|---|
| 1,191,486 A | 7/1916 | Tyler |
| 1,993,984 A | 3/1935 | Wulle et al. |
| 2,444,988 A | 7/1948 | Guamaschelli |
| 2,616,728 A | 11/1952 | Pitt |
| 2,666,657 A | 1/1954 | Howard et al. |
| 2,693,223 A | 11/1954 | Krupp |
| 2,913,011 A | 11/1959 | Noyes et al. |
| 3,023,496 A | 3/1962 | Millar |
| 3,029,094 A | 4/1962 | Parlasca et al. |
| 3,087,745 A | 4/1963 | Rumbell |
| 3,096,104 A * | 7/1963 | Browning ............... 285/226 |
| 3,232,640 A | 2/1966 | Donkle, Jr. |
| 3,420,553 A | 1/1969 | Poxon et al. |
| 3,907,339 A | 9/1975 | Stumpf et al. |
| 4,114,657 A | 9/1978 | Langenfeld |
| 4,867,269 A | 9/1989 | Lalikos et al. |
| 5,145,215 A | 9/1992 | Udell |
| 5,163,718 A | 11/1992 | Cannon |
| 5,340,165 A * | 8/1994 | Sheppard ............... 285/226 |
| 5,403,044 A | 4/1995 | Holl |
| 5,437,479 A * | 8/1995 | Hartling et al. ............ 285/49 |
| 5,660,419 A | 8/1997 | Kim |

(Continued)

FOREIGN PATENT DOCUMENTS

DE   19744663 A1   10/1996

(Continued)

Primary Examiner—David Bochna
(74) Attorney, Agent, or Firm—Kirton & McConkie; Evan R. Witt

(57) ABSTRACT

A flexible tube for an exhaust pipe for an automobile includes a bellows member (10) corrugated to have alternate ridges (11) and furrows (12) along its outer periphery; outer braids (20) provided to enclose the bellows member (10); fixing caps (30) fitted onto both side ends of the outer braids (20) respectively; and a spring member (40) provided on a circumferential surface of the outer braids (20). The bellows member (10) has lower ridges (13) in its center as well as regular ridges (11) on both sides thereof to more effectively absorb over-vibration of an exhaust system of an automobile and to enhance durability of the bellows member (10).

4 Claims, 3 Drawing Sheets

U.S. PATENT DOCUMENTS

| | | | |
|---|---|---|---|
| 5,769,464 A | 6/1998 | DeBlasi et al. | |
| 5,791,696 A | 8/1998 | Miyajima et al. | |
| 5,791,697 A | 8/1998 | Godel et al. | |
| 5,797,628 A | 8/1998 | Kuhn | |
| 5,806,899 A | 9/1998 | Norikawa et al. | |
| 5,813,704 A | 9/1998 | Naito | |
| 5,835,972 A | 11/1998 | Choate | |
| 5,842,723 A | 12/1998 | Hartling et al. | |
| 5,901,754 A | 5/1999 | Elsasser et al. | |
| 5,967,193 A | 10/1999 | Nagai et al. | |
| 6,047,993 A | 4/2000 | Jungbauer | |
| 6,062,268 A | 5/2000 | Elsasser et al. | |
| 6,151,893 A | 11/2000 | Watanabe et al. | |
| 6,220,023 B1 | 4/2001 | Ezzeddini et al. | |
| 6,230,748 B1 | 5/2001 | Krawietz et al. | |
| 6,240,969 B1 | 6/2001 | Wildermuth | |
| 6,296,282 B1 | 10/2001 | Burkhardt et al. | |
| 6,354,332 B1 | 3/2002 | Burkhardt et al. | |
| 6,354,632 B1 | 3/2002 | Jung et al. | |
| 6,425,171 B1 | 7/2002 | Quaranta | |
| 6,554,321 B1 | 4/2003 | Boisseau et al. | |
| 6,848,478 B2 * | 2/2005 | Nagai | 138/112 |
| 6,866,302 B2 | 3/2005 | Furata | |
| 6,902,203 B2 * | 6/2005 | Kang | 285/226 |
| 2004/0100096 A1 | 5/2004 | Atansoski et al. | |

FOREIGN PATENT DOCUMENTS

| | | | |
|---|---|---|---|
| EP | 0709558 | 5/1996 | |
| FR | 2644552 | * 9/1990 | 285/226 |
| JP | 10311217 | 11/1998 | |

* cited by examiner

FLEXIBLE TUBE FOR AN EXHAUST PIPE OF AN AUTOMOBILE

FIELD OF THE INVENTION

The present invention relates to a flexible tube for an exhaust pipe of an automobile, and more particularly to a flexible tube including a bellows member having lower ridges in its center as well as regular ridges on both sides thereof to more effectively absorb over-vibration of an exhaust system of an automobile and to enhance durability of the bellows member.

BACKGROUND OF THE INVENTION

These days, automobiles tend to have an, increased vibration of engine roll in case of engine starting, abrupt starting and braking of an automobile, or gear shifting, due to increased output of power from the engine.

Further, while driving, depending on road conditions, an exhaust pipe is vibrated.

The exhaust pipe is connected to an engine of an automobile to discharge the exhaust gas, and in an intermediate part between the engine and the exhaust pipe, a flexible tube is provided as a decoupler joint, which is firm and compact enough to absorb and buffer displacements of vibration, load of impact, heat distortion, etc.

As shown in FIG. 1 and disclosed in EP 0410089 A1, a conventional flexible tube includes a bellows member (10) made of metallic material in the form of a corrugated cylinder to absorb stresses due to expansion, contraction or bending thereof, and an interlock member (53) provided inside of the bellows member (10) to absorb stresses due to expansion, contraction, bending, etc. and controlled to be displaced within the limit of elasticity of the bellows member (10), so that the exhaust gas can flow therethrough smoothly and the bellows member (10) can be protected from the exhaust gas in high temperatures.

The conventional flexible tube further includes outer braids (20) enclosing the external surface of the bellows member (10).

With the outer braids (20) surrounding the bellows member (10), both ends of the outer braids (20) are circumferentially compressed with fixing caps (30) and they are spot-welded together for secure attachment.

With the above structure, the conventional flexible tube is connected to the engine at one end and to the exhaust pipe at the other end, thus facilitating the smooth passage of the exhaust gas therethrough and absorbing the impact and stresses generated between the engine and the exhaust pipe through the expansion and contraction of the bellows member (10) and the interlock member (53).

The conventional flexible tube, however, has been designed to be long in its total length to improve the riding comfort of drivers and passengers of the automobile, and accordingly the bellows member (10) was corrugated long enough to have many ridges and furrows.

Accordingly, when over-vibration occurred in the exhaust system, the vibration on the flexible tube increased, in which case the outer braids (20) came into contact with the bellows member (10) intermittently and such contact caused abrasion and noise. Thus, N.V.H. (noise, vibration & harshness) evaluation deteriorated and the durability of the flexible tube became reduced.

In order to solve these problems, the inventor has proposed a flexible tube for an exhaust pipe of an automobile in Korean Patent Application No. 2004-56469.

The proposed flexible tube comprises, as shown in FIG. 2, a bellows member (10) formed in the shape of a hollow cylinder having a predetermined width and length and corrugated to have alternate ridges (11) and furrows (12) along its outer periphery; outer braids (20) woven at predetermined angles and provided at a predetermined distance from the outer periphery of the bellows member (10) to enclose the bellows member (10); fixing caps (30) fitted onto both side ends of the outer braids (20) respectively, so that both side ends of the outer braids (20) can be fixed around both side ends of the bellows member (10); and a spring member (40) having elasticity and provided on a circumferential surface of the outer braids (20) to be closely contacted thereto, whereby the spring member (40) absorbs the over-vibration generated in the exhaust system and promotes the damping effect of the outer braids (30) and the bellows member (10), and thus it cannot only absorb the over-vibration generated in the exhaust system, but also restrain the subsequent amplified over-vibration in the flexible tube.

However, in the above conventional flexible tube, since the bellows member (10) was formed to have no ridges and furrows at a part where the spring member (40) was provided, the vibration generated from the flexible tube itself could be controlled, but the expansion and contraction of the bellows member (10) was not enough to control the vibration and exhaust noise generated while driving.

Further, with the above structure of the conventional flexible tube, since the vibration to be absorbed by the bellows member (10) could not be distributed uniformly but partly concentrated over the bellows member (10), durability of the bellows member (10) remarkably deteriorated.

In addition, the flexible tube was usually constructed in a manner that the impact and vibration generated at both side ends thereof should be transmitted to its central part. However, since the ridges and furrows of the bellows member (10) were not provided partly, the impact and vibration could not be effectively absorbed in the central part of the bellows member (10).

SUMMARY OF THE INVENTION

An object of the present invention is to provide a flexible tube for an exhaust pipe of an automobile, which can effectively absorb and control the impact and vibration generated from the flexible tube itself as well as from the outside and over-vibration of an exhaust system of the automobile, by optimizing the expansion and contraction of a bellows member.

Another object of the present invention is to provide a flexible tube including a bellows member with increased durability.

In order to achieve the above objects, the present invention provides a flexible tube for an exhaust pipe of an automobile, which comprises:

a bellows member formed in the shape of a hollow cylinder and corrugated to have alternate ridges and furrows along its outer periphery;

outer braids woven at predetermined angles and provided to enclose the bellows member keeping a predetermined distance from the outer periphery of the bellows member;

fixing caps fitted onto both side ends of the outer braids respectively, so that both side ends of the outer braids can be fixed around those of the bellows member; and a spring member having elasticity and provided on a circumferential surface of the outer braids to be closely contacted thereto, wherein the bellows member has lower ridges in its center as well as regular ridges on both sides thereof.

As the lower ridges are provided in the center of the bellows member, the vibration generated in the central part of the bellows member can be effectively damped and the impact and vibration from the outside can be uniformly distributed over the entire bellows member.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention, wherein.

DESCRIPTION OF THE PREFERRED EMBODIMENTS

Figure 1:
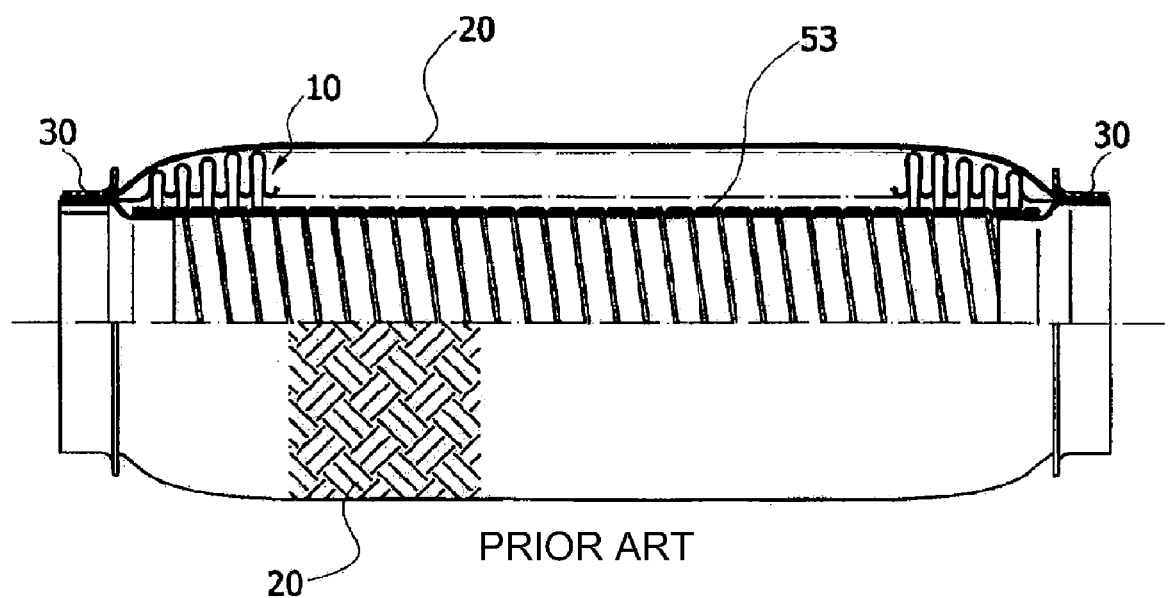
FIG. 1 is a partial sectional views of the conventional flexible tube for an exhaust pipe of an automobile.
Figure 2:
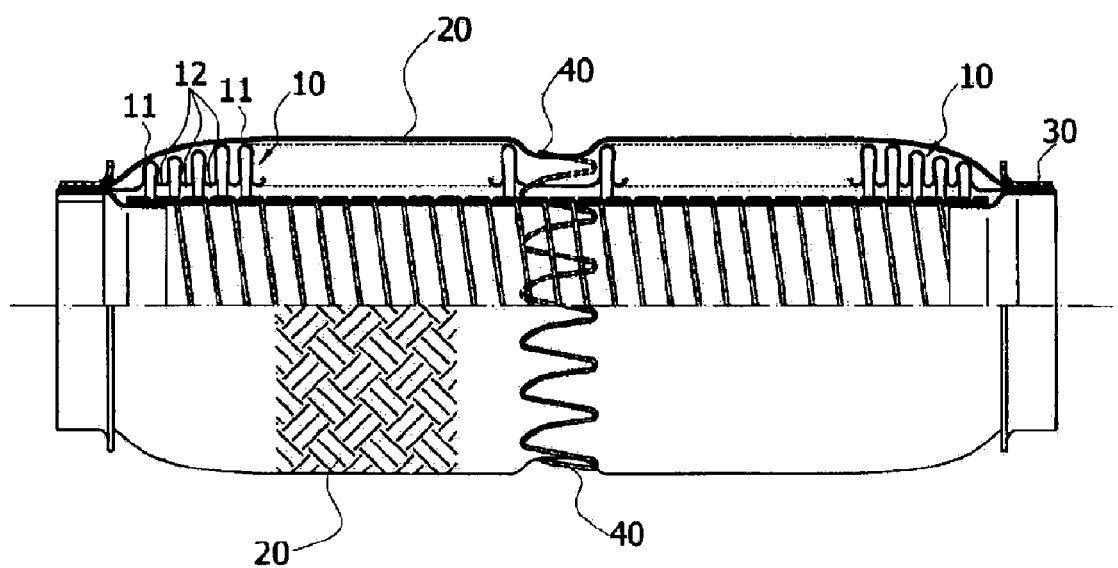
FIG. 2 is a partial sectional view of an exhaust pipe of an automobile disclosed in Korean Patent Application No. 2004-56469.

Reference will now be made in detail to preferred embodiments of the present invention in conjunction with the accompanying drawings.

A flexible tube (1) for an exhaust pipe of an automobile according to the present invention comprises: a bellows member (10) formed in the shape of a hollow cylinder and corrugated to have alternate ridges (11) and furrows (12) along its outer periphery; outer braids (20) woven at predetermined angles and provided to enclose the bellows member (10) keeping a predetermined distance from the outer periphery of the bellows member (10); fixing caps (30) fitted onto both side ends of the outer braids (20) respectively, so that both side ends of the outer braids (20) can be fixed around those of the bellows member (10); and a spring member (40) having elasticity and provided on a circumferential surface of the outer braids (20) to be closely contacted thereto, wherein the bellows member (10) has lower ridges (13) in its center as well as regular ridges (11) on both sides thereof.

Figure 3:
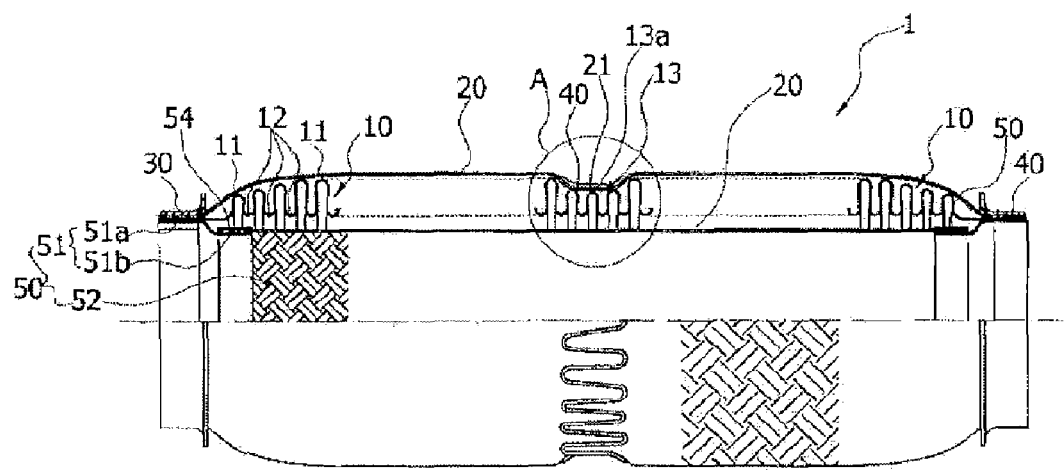
FIG. 3 is a partial sectional view of a flexible tube for an exhaust pipe of an automobile according to the present invention.

Referring to FIG. 3, the spring member (40) is wound on a central circumferential surface of the outer braids (30), and inner braids (52) are provided inside of the outer braids (30) as a gas guiding means.

Figure 4:
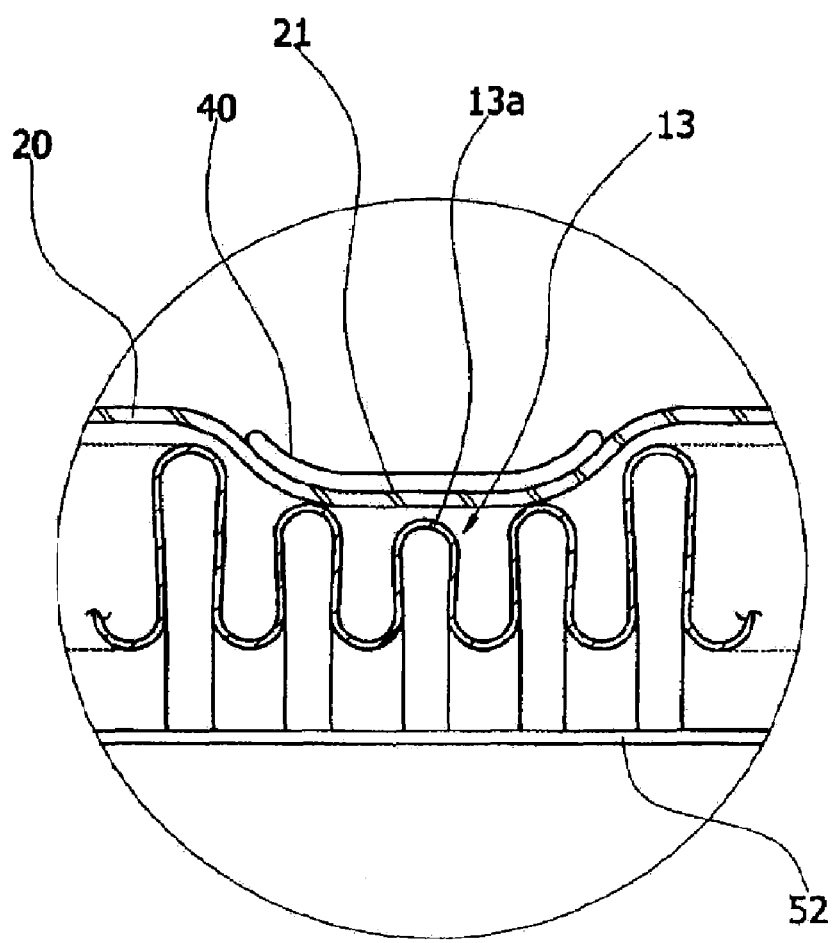
FIG. 4 is an enlarged view of the part "A" of FIG. 3.

In FIG. 4, the lower ridges (13) including a central ridge (13a) are provided in the central part of the bellows member (10).

Figure 5:
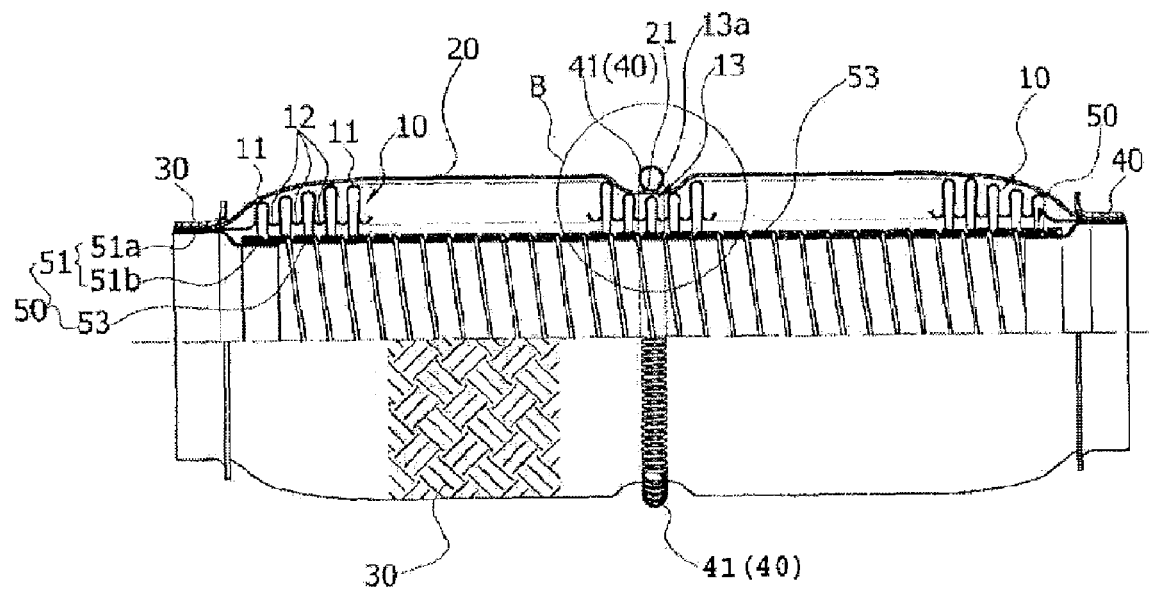
FIG. 5 is a partial sectional view showing an embodiment of a flexible tube for an exhaust pipe of an automobile according to the present invention.

In FIG. 5, a coil spring (41) is wound along the central circumferential surface of the outer braids (20) and an interlock member (53) is provided inside the outer braids (20) as a gas guiding means.

Figure 6:
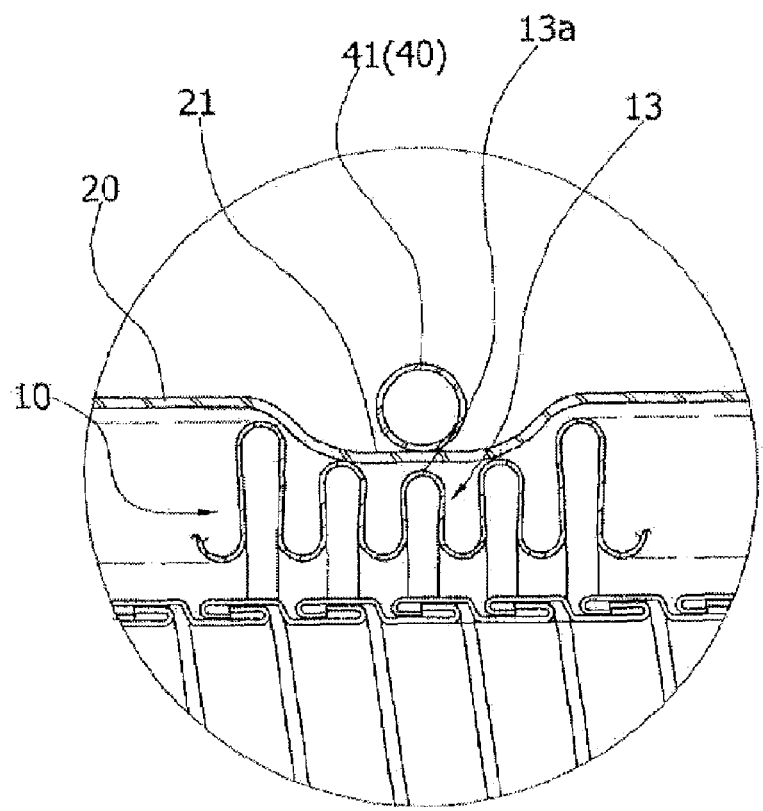
FIG. 6 is an enlarged view of the part "B" of FIG. 5.

As in FIG. 4, FIG. 6 shows the lower ridges (13) in an enlarged view provided in the central part of the bellows member (10), As shown in FIG. 3, the bellows member (10) of the flexible tube (1) according to the present invention is made of metallic material and formed in the shape of a hollow cylinder having a predetermined width and length.

The bellows member (10) is corrugated to have the alternate ridges (11) and furrows (12). The ridges (11) become higher along a longitudinal direction from both side ends of the bellows member (10) and then have a constant height on both sides of the bellows member (10). The furrows (12) are repeatedly formed along the longitudinal direction of the bellows member (10) to have the same bottom point.

Further, the bellows member (10) includes the lower ridges (13) at its central part, which are lower than the regular ridges (11) formed on both sides thereof.

The lower ridges (13) include the central lowest ridge (13a), and centering around the lowest ridge (13a), they become higher symmetrically towards both sides of the bellows member (10).

Outside of the bellows member (10), the outer braids (20) made by weaving wires at predetermined angles are provided to enclose the bellows member (10).

The wires of the outer braids (20) are slightly stressed and deformed by the displacement in the direction of pressure and are elastically transformed over the tensile strength. Since the wires do not transform any more after being elongated by a certain length, they serve to control the displacement over the tensile strength.

Further, the fixing caps (30) are respectively assembled onto both side ends of the outer braids (30), so that the wires of the outer braids (30) cannot become unweaved and both side ends of the outer braids (20) can be fixed firm around both side ends of the bellows member (10).

The spring member (40) having elasticity is provided along the central circumferential surface of the outer braids (20) in such a manner to clamp the external circumference of the outer braids (20).

A groove (21) is formed on the central circumferential surface of the outer braids (20) to have the spring member (40) seated thereon, and is kept apart from the lower ridges (13) at a predetermined distance.

The spring member (40) is seated on the groove (21) in a manner to clamp the external circumference of the outer braids (20).

Therefore, if over-vibration occurs in the exhaust systems and the over-vibration is transferred to the outer braids (20), the spring member (40) absorbs the vibration by its own elastic force.

Then, if the spring member (40) absorbs the over-vibration generated in the exhaust system, it promotes the damping effect of the outer braids (20) and the bellows member (10), and thus the generation of noise and harshness can be prevented.

Further, due to the increase of the damping effect of the outer braids (20) and the bellows member (10), over-vibration of the flexible tube at its resonance frequency can also be restrained.

Also, according to the present invention, since the bellows member (10) has the lower ridges (13) at its central part, if the flexible deformation of the bellows member (10) increases due to the over-vibration occurred in the flexible tube (1), the deformation can evenly distribute over the entire bellows member (10) and the vibration can be absorbed more effectively.

Therefore, since the vibration can be absorbed by the entire bellows member (10) and is not concentrated over a certain part of the bellows member (10), the bellows member (10) can be prevented from being damaged and become endurable.

Meanwhile, inside the bellow member (10), a gas guiding means (50) is provided to absorb the deformation due to expansion, contraction and bending of the flexible tube, to control the displacement within the limit of elasticity of the bellows member (10), to guide the flow of the exhaust gas therein smoothly and to protect the bellows member (10) from the exhaust gas in high temperatures, so that the durability of the bellows member (10) can be increased.

The gas guiding means (50) comprises a pair of inner sleeves (51) provided at both side ends of the bellows member (10), each of which having a fixing part (51*a*) fitted to an inner end of the bellows member (10) and a securing part (51*b*) extended from the fixing part (51*a*) and spaced from the furrows (12) of the bellows member (10) at a predetermined distance; and inner braids (52) woven with metallic wires and having both ends fixed on the securing parts (51*b*) of the inner sleeves (51).

The inner sleeves (51) may be fixed on both side ends of the bellows member (10) by spot-welding their fixing parts (51*a*). The securing parts (51*b*) are inwardly extended from the fixing parts (51*a*) and bent, so that they have a smaller diameter than the fixing parts (51).

The inner braids (52) are in the form of a hollow cylinder, and if an axial load or bending displacement is given, the inner braids (52) can damp down due to the friction between woven wires of two folds.

Further, the inner braids (52) serve to guide the exhaust gas flowing therein, so that the exhaust resistance or noise caused by the contact of the exhaust gas with the bellows member (10) can be prevented, and the endurance of the bellows member (10) can be improved.

Alternatively, as shown in FIGS. 5 and 6, the gas guiding means (50) may comprise a pair of inner sleeves (51) provided at both side ends of the bellows member (10), each of which having a fixing part (51*a*) fitted to an inner end of the bellows member (10) and a securing pan (51*b*) extended from the fixing part (51*a*) and spaced from the furrows (12) of the bellows member (10) at a predetermined distance; and an interlock member (53) wound spirally to form a spiral groove and having both ends fixed on the securing parts (51*b*) of the inner sleeves (51).

Therefore, when the flexible tube (1) is under the load in an axial direction or under bending displacement, the friction between components of the interlock member (53) causes damping effects, which mainly absorb stresses in the longitudinal direction. Also, the interlock member (53) keeps the passage of the exhaust gas constant, so that the occurrence of turbulence can be prevented.

Meanwhile, a front end of the fixing part (51*a*) is positioned to be in accord with the end of the bellows member (10). The respective ends of the bellows member (10), the outer braids (20) and the fixing cap (30) are clamped together circumferentially by a clamping means. Then, they are fixed together in several spots around their circumferences by simultaneous spot welding.

The spring member (40) may be the coil spring (41). Any other springs may also be used as the spring member (40) and can be included in the present invention.

As described above, according to the present invention, since the lower ridges (13) are provided in the central part of the bellows member (10), damping effect is not concentrated on a certain part of the bellows member (10), so that the bellow member (10) can be prevented from damages.

Therefore, the present invention can improve the endurance and damping effects of the bellows member (10) and thus the life of automobiles and the N.V.H. (noise, vibration & harshness) evaluation can be maximized.

It will be apparent to those skilled in the art that various modifications and variations can be made to the present invention without departing from the spirit and scope of the invention. The present invention covers the modifications and variations thereof provided they come within the scope of the appended claims and their equivalents.

What is claimed is:

1. A flexible tube for an exhaust pipe of an automobile comprising:
    a bellows member (10) formed in the shape of a hollow cylinder and corrugated to have alternate ridges (11) and furrows (12) along its outer periphery;
    outer braids (20) woven at predetermined angles and provided to enclose the bellows member (10) keeping a predetermined distance from the outer periphery of the bellows member (10);
    fixing caps (30) fitted onto both side ends of the outer braids (20) respectively, so that both side ends of the outer braids (20) can be fixed around those of the bellows member (10); and
    a spring member (40) having elasticity and provided on a circumferential surface of the outer braids (20) to be closely contacted thereto,
    wherein the bellows member (10) has lower ridges (13) in its center as well as regular ridges (11) on both sides thereof, wherein the lower ridges (13) include a central lowest ridge (13*a*), and centering around the lowest ridge (13*a*), they become higher symmetrically towards both sides of the bellows member (10).

2. The flexible tube for an exhaust pipe of an automobile as claimed in claim 1, wherein a gas guiding means (50) is provided inside the bellows member (10).

3. The flexible tube for an exhaust pipe of an automobile as claimed in claim 2, wherein the gas guiding means (50) comprises a pair of inner sleeves (51) provided at both side ends of the bellows member (10), each of which having a fixing part (51*a*) fitted to an inner end of the bellows member (10) and a securing part (51*b*) extended from the fixing part (51*a*) and spaced from the fuffows (12) of the bellows member (10) at a predetermined distance; and inner braids (52) woven with metallic wires and having both ends fixed on the securing parts (51*b*) of the inner sleeves (51).

4. The flexible tube for an exhaust pipe of an automobile as claimed in claim 2, characterized in that the gas guiding means (50) comprises a pair of inner sleeves (51) provided at both side ends of the bellows member (10), each of which having a fixing part (51*a*) fitted to an inner end of the bellows member (10) and a securing part (51*b*) extended from the fixing part (51*a*) and spaced from the furrows (12) of the bellows member (10) at a predetermined distance; and an interlock member (53) wound spirally to form a spiral groove and having both ends fixed on the securing parts (51*b*) of the inner sleeves (51).

* * * * *

UNITED STATES PATENT AND TRADEMARK OFFICE
CERTIFICATE OF CORRECTION

PATENT NO. : 7,264,280 B2 Page 1 of 1
APPLICATION NO. : 11/213532
DATED : September 4, 2007
INVENTOR(S) : Dae Hyun Kim It is certified that error appears in the above-identified patent and that said Letters Patent is hereby corrected as shown below:

In column 6 line 45, please delete "fuffows" and replace it with --forrows--.

Signed and Sealed this

Eighth Day of July, 2008

JON W. DUDAS
*Director of the United States Patent and Trademark Office*